(12) United States Patent
Ulrich et al.

(10) Patent No.: US 7,554,726 B2
(45) Date of Patent: Jun. 30, 2009

(54) OBJECTIVE FOR EVANESCENT ILLUMINATION AND MICROSCOPE

(75) Inventors: Heinrich Ulrich, Heidelberg (DE); Werner Knebel, Kronau (DE); Kyra Moellmann, Trippstadt (DE); Peter Euteneuer, Lahnau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/415,412

(22) Filed: May 1, 2006

(65) Prior Publication Data

US 2006/0250689 A1 Nov. 9, 2006

Related U.S. Application Data

(63) Continuation of application No. PCT/EP2004/052287, filed on Sep. 23, 2004.

(30) Foreign Application Priority Data

Sep. 25, 2003 (DE) ................. 103 44 410
Sep. 10, 2004 (DE) ............ 10 2004 044 308

(51) Int. Cl.
*G02B 21/06* (2006.01)
(52) U.S. Cl. ...................................... 359/385
(58) Field of Classification Search ............... 359/385
See application file for complete search history.

(56) References Cited

U.S. PATENT DOCUMENTS

| | | | |
|---|---|---|---|
| 6,255,642 B1 * | 7/2001 | Cragg et al. | 250/216 |
| 6,819,484 B2 * | 11/2004 | Aono et al. | 359/368 |
| 6,914,236 B2 * | 7/2005 | Hoffmann | 250/234 |
| 6,987,609 B2 * | 1/2006 | Tischer et al. | 359/385 |
| 2002/0097489 A1 * | 7/2002 | Kawano et al. | 359/388 |
| 2003/0058530 A1 | 3/2003 | Kawano | |
| 2003/0086163 A1 * | 5/2003 | Aono et al. | 359/388 |
| 2004/0001253 A1 | 1/2004 | Abe et al. | |
| 2004/0196549 A1 * | 10/2004 | Aono | 359/388 |

FOREIGN PATENT DOCUMENTS

| | | |
|---|---|---|
| DE | 34 09 657 | 9/1985 |
| DE | 101 08 796 | 9/2002 |
| DE | 101 43 481 | 3/2003 |
| DE | 102 17 098 | 11/2003 |
| DE | 102 29 935 | 1/2004 |
| WO | WO03/023483 | 3/2003 |

* cited by examiner

*Primary Examiner*—Lee Fineman
(74) *Attorney, Agent, or Firm*—Houston Eliseeva LLP

(57) ABSTRACT

A microscope comprises an objective and a light source that produces an illumination light beam—in particular for evanescent illumination of a sample, which exhibits a focus in the plane of the objective pupil. To adjust the penetration depth, an adjustment mechanism is provided with which the spatial position of the focus within the plane of the objective pupil may be changed.

32 Claims, 5 Drawing Sheets

US 7,554,726 B2

OBJECTIVE FOR EVANESCENT ILLUMINATION AND MICROSCOPE

RELATED APPLICATIONS

This application is a Continuation of PCT application serial number PCT/EP04/52287 filed on Sep. 23, 2004 which in turn claims priority to German application serial number DE 103 44 410.6 filed on Sep. 25, 2003 and German application serial number DE 10 2004 044 308.4 filed on Sep. 10, 2004, both of which are incorporated herein by reference in their entirety.

FIELD OF THE INVENTION

The invention relates to a microscope with an objective and with a light source that produces an illumination light beam—in particular for evanescent illumination of a sample, which exhibits a focus in the plane of the objective.

The invention further relates to an illumination module with a light source that produces an illumination beam.

BACKGROUND OF THE INVENTION

The microscope with evanescent illumination of a sample is known from US 2002/0097489 A1. The microscope comprises a white light source, the light of which is coupled for the purpose of evanescent illumination via a slit aperture through the microscope objective onto a sample holder, which holds a sample. The illumination light propagates itself in the sample holder by means of total internal reflection, whereby the illumination of the sample occurs only in the region of the evanescent field that protrudes from the sample holder. Microscopes of this type are known as "total internal reflection fluorescent microscopes" (TIRFM).

The z-resolution of TIRF microscopes is extraordinarily good because the evanescent field protrudes only about 100 nm into the sample.

A high-aperture objective specifically for TIRF application is known from DE 101 08 796 A1. The objective comprises a first lens with positive refractive power and a second lens with negative refractive power, whereby the focal distance ratio between the two lenses is in the −0.4 and −0.1 range, and the total refractive power is greater than zero. The objective further comprises two positive lenses, the diameter ratio to focal length of which is greater than 0.3 and less than 0.6. The objective further comprises a negative lens and a collecting lens, whereby the negative lens faces the front group, and the focal distance ratio of the negative lens to the collector lens is between −0.5 and −2.

An incident illumination device for TIRF microscopy is known from DE 102 17 098 A1. The incident illumination device comprises an illumination source that emits a polarized illumination beam when in operation, which propagates at an angle to the optical axis and a deflector that deflects the illumination light beam and couples it parallel to the optical axis in the objective. Provision is made in this incident illumination device for the illumination light beam emitted by the illumination source to exhibit a phase difference in the s- and p-polarization directions, and for the deflection arrangement to reflect the illumination light beam x times, whereby x=(nx 180°−d)/60°.

A microscope for total internal reflection microscopy (TIRM) is known from DE 101 43 481 A1. The microscope exhibits a microscope housing and an objective. The illumination light emitted by an illumination device can be coupled via an adapter that can be inserted into the microscope housing.

A microscope with an optical illumination system that enables simple switching between evanescent illumination and reflective illumination is known from US 2004/0001253 A1. The illumination system comprises a laser light source, the light of which is coupled in an optical fiber. Furthermore, an outcoupling optic is provided that focuses the outgoing light from the fiber onto a rear focal point of the microscope objective. The optical fiber is movable along a plane that is perpendicular to the optical axis of the microscope objective.

A device for coupling light in a microscope is known from DE 102 29 935 A1. Here, a laser light is directed onto a sample in the illuminated field diaphragm plane by a laser light fiber coupling, which is implemented as a slide. The invention is particularly suitable for the TIRF method.

In scanning microscopy, a sample is illuminated with a light beam to observe the detection light emitted by the sample as reflection or fluorescent light. The focus of an illumination light beam is moved on an object plane with the help of a movable beam deflector, generally by tipping two mirrors, whereby the axes of deflection are usually positioned perpendicular to each other, so that one mirror deflects in the x-direction and the other in the y-direction. The mirrors are tipped with the help of galvanometric positioners, for example. The power of the light coming from the object is measured dependent on the position of the scanning beam. Generally, the positioners are provided with sensors to determine the actual position of the mirrors. In confocal scanning microscopy, in particular, an object is scanned in three dimensions with the focus of a light beam.

A confocal scanning microscope generally comprises a light source, a focusing optic with which the light from the source is focused on a pinhole aperture—the so-called excitation aperture, a beam splitter, a beam deflector to control the beam, a microscope optic, a detection aperture, and detectors to detect the detection light or fluorescent light. The illumination light is coupled via a beam splitter. The fluorescent light or reflected light emitted by the object returns to the beam splitter via the beam deflector, passes through it, and is subsequently focused onto the detection aperture, behind which are located the detectors. This arrangement of detectors is called a descan arrangement. Detection light that does not originate directly from the focal region takes another light path and does not pass through the detection aperture so that pixel information is obtained, which is converted into a three-dimensional image by sequential scanning of the object with the focus of the illumination light beam. A 3-dimensional image is usually achieved by means of layered image data.

SUMMARY OF THE INVENTION

It is a task of the present invention to disclose a microscope that enables variable adjustment of the penetration depth of illumination light, in particular for evanescent illumination of a sample.

This task is solved by a microscope, wherein an adjustment mechanism is provided with which the spatial position of the focus within the plane of the objective pupil may be changed.

A further task of the present invention is to disclose an illumination module for a microscope that enables illumination of a microscopic sample, in particular for evanescent sample illumination with adjustable penetration depth.

The further task is solved by an illumination module, wherein the illumination module may be coupled to a microscope such that the illumination light beam in the plane of the objective pupil of the microscope exhibits a focus, and wherein the illumination module comprises an adjustment mechanism with which the spatial position of the focus within the plane of the object pupil may be changed.

It has been recognized, according to the invention, that the penetration depth of an evanescent illumination field in a sample is dependent on the angle at which total reflection at the cover glass interface or at the sample holder interface occurs. This angle is directly correlated with the angle relative to the optical axis at which the illumination light beam which is provided for evanescent sample illumination exits from the objective via the front lens. This angle, in turn, is dependent upon the distance from the optical axis at which the illumination light beam passes through the rear focal plane of the objective (pupil). In order to have available a largely parallel illumination light beam for the purpose of evanescent sample illumination, the illumination light beam must exhibit a focus in the rear focal plane of the objective. Finally, the distance of the focus to the optical axis of the objective determines the aforementioned angle, and therewith the penetration depth of the evanescent field in the sample to be tested.

In a preferred embodiment of the microscope according to the invention, the adjustment mechanism comprises an adjustable beam deflector that is arranged in the beam path of the illumination light beam. Preferably, the beam deflector comprises at least one galvanometric mirror. In order to position the focus at any given location within the objective pupil, the beam deflector preferably comprises two galvanometric mirrors, which cause deflection of the illumination light beam in different lateral directions (e.g., x- and y-direction). The beam deflector may also comprise rotatable or tippable prisms and/or rotatable or tippable mirrors. The use of acousto-optical or electro-optical deflection elements can also be envisioned.

In a further embodiment of the invention, the adjustment mechanism comprises a light-conducting fiber which is at least partially movable. In this variant, mechanical positioners are preferably provided that enable the light outgoing end of the light-conducting fiber to be positioned precisely within the objective pupil. The illumination light beam in this further development of the invention is focused onto the light incoming end of the light-conducting fiber, conveyed through the light-conducting fiber, and de facto again exhibits a focus at the outcoupling end that is positioned within the objective pupil, because of the small diameter of customarily used light-conducting fibers.

As previously explained, it is particularly important to adjust the distance of the focus of the illumination light beam in the objective pupil relative to the optical axis of the objective in order to adjust the penetration depth of the evanescent field in the sample region.

It can be particularly advantageous for certain applications to drive the adjustment mechanism such that the focus describes a selectable curve path within the objective pupil plane. By so doing, particularly homogeneous illumination can, for example, be achieved. In certain experiments, it is possible with this variant to effect constant alternation in polarization direction. In a particularly preferred embodiment of the invention, the curve path is a circular path. An embodiment of the invention in which the curve path is a circular path the midpoint of which lies on the optical axis of the objective is very particularly preferred. In this variant, the penetration depth remains constant while the focus describes the circle of the curve path, whereby, however the illumination light beam that exits from the objective is continuously coupled to the cover glass or to the sample holder from various directions. It is also possible to select different coupling directions in order to compare the resultant, possibly different, images of the sample.

In a very preferred variant, a compensating optic is provided in order to compensate for unevennesses in the objective pupil plane.

Preferably, the microscope objective is exchangeable (e.g., objective turret), whereby a compensating optic is provided to compensate for the various pupil positions of different objectives. The distances between the front focal plane and the rear focal plane may differ from objective to objective, which may lead to problems because in order to achieve optimal evanescent sample illumination, the focus of the illumination light beam must lie more or less exactly in the objective pupil. The aforementioned compensating optic, which may, for example, be a zoom optic or several exchangeable optics arranged on a turret, compensates for these differences in distance.

In a preferred embodiment of the microscope according to the invention, a light trap is provided to eliminate unused illumination light. Only a portion of the illumination light coupled to the cover glass or sample holder actually evanescently illuminates the sample. The light, which again exits from the cover glass or from the sample holder after several total reflections, many return to the microscope again and lead to imaging disturbances (as a result, for example, of scattered light). This is avoided, according to the invention, by a suitably arranged light trap.

In a particularly preferred embodiment of the microscope, a switch is provided for switching between classic incident illumination and evanescent sample illumination. The switch may, for example, comprise a wing mirror.

Preferably, the light cone is variable, in particular for changing the azimuth. An aperture optic such as an iris optic arranged in the intermediate image plane may be provided in order to set the diameter of the illumination light beam that exits from the microscope objective.

In a particular embodiment a camera is provided for imaging. The camera may, in a particularly preferred variant, be implemented as a color camera, or as a CCD camera.

Preferably, the objective exhibits a numeric aperture that is greater than 1.4, in particular greater than 1.45, in particular greater than 1.6. Preferably, the numeric aperture of the objective is 1.45 or 1.65.

In a particular variant, at least the light source and the adjustment mechanism are incorporated in a single illumination module, which can preferably be coupled to a microscope and/or a microscope stand.

The illumination module, according to the invention, offers the advantage that it may be coupled as a retrofit to a preexistent microscope or microscope stand.

BRIEF DESCRIPTION OF THE DRAWINGS

The object of the invention is schematically represented in the diagram, and is described below on the basis of figures, wherein elements that have the same function are given the same reference numbers. They show.

DETAILED DESCRIPTION OF THE PREFERRED EMBODIMENTS

Figure 1:
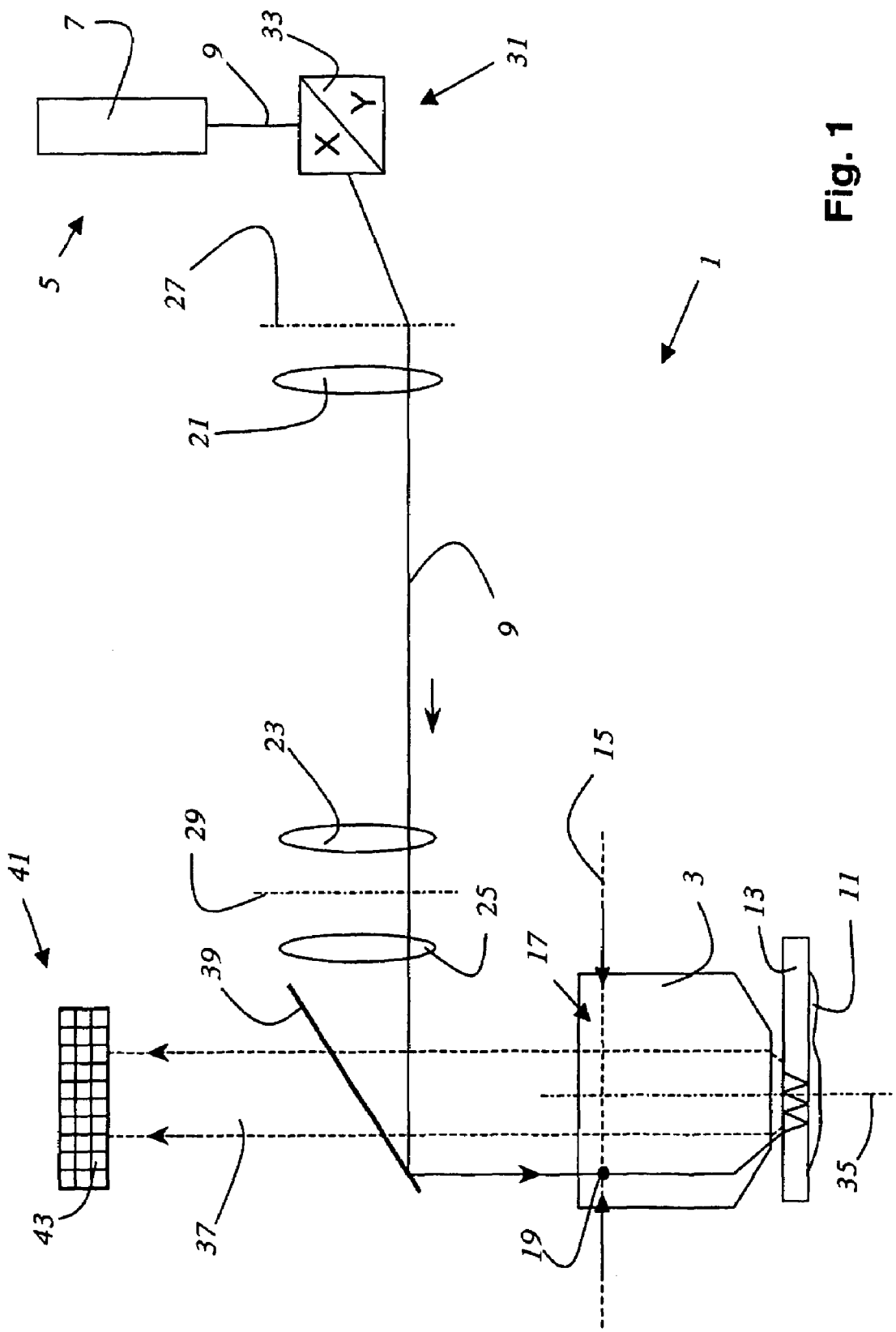
FIG. 1 a microscope according to the invention.

FIG. 1 shows a microscope 1 according to the invention, with an objective 3 and a light source 5, which is implemented as a laser 7 and which produces an illumination light beam 9. The illumination light beam 9 emitted by the light source 5 enables evanescent illumination of a sample 11 that is positioned on a sample holder 13. The illumination light beam 9 exhibits a focus 19, which is represented by a point, on the plane 15 of the objective pupil 17. Several optical elements for guiding and shaping the beam are located in the beam path of the microscope 1. There may, for example, be a first optic 21, a second optic 23, and an optic 25, which produce a first intermediate image plane 27 and a second intermediate image plane 29. The spatial position of the focus 19 within the plane 15 of the objective pupil 17 may be changed with the help of an adjustment mechanism 31, which comprises an adjustable beam deflector 33. The adjustable beam deflector 33 comprises a cardanically suspended rotating mirror, which is not depicted. The distance of the focus 19 to the optical axis 35 of the objective 3 may be adjusted, and therewith the penetration depth of the illumination light beam in the sample 11 varied using the adjustment mechanism 31. The detection light 37 exiting from the sample 11 passes through the objective 3 as well as through the beam splitter 39, which directs the illumination light beam 9 to the objective 3, and through it to a detector 41 that is implemented as a CCD camera. The beam splitter 39 is implemented as a dichroic beam splitter, and designed such that the light of the wavelength of the illumination light beam is reflected, whereas light of the wavelength of the detection light 37 may pass through.

Figure 2:
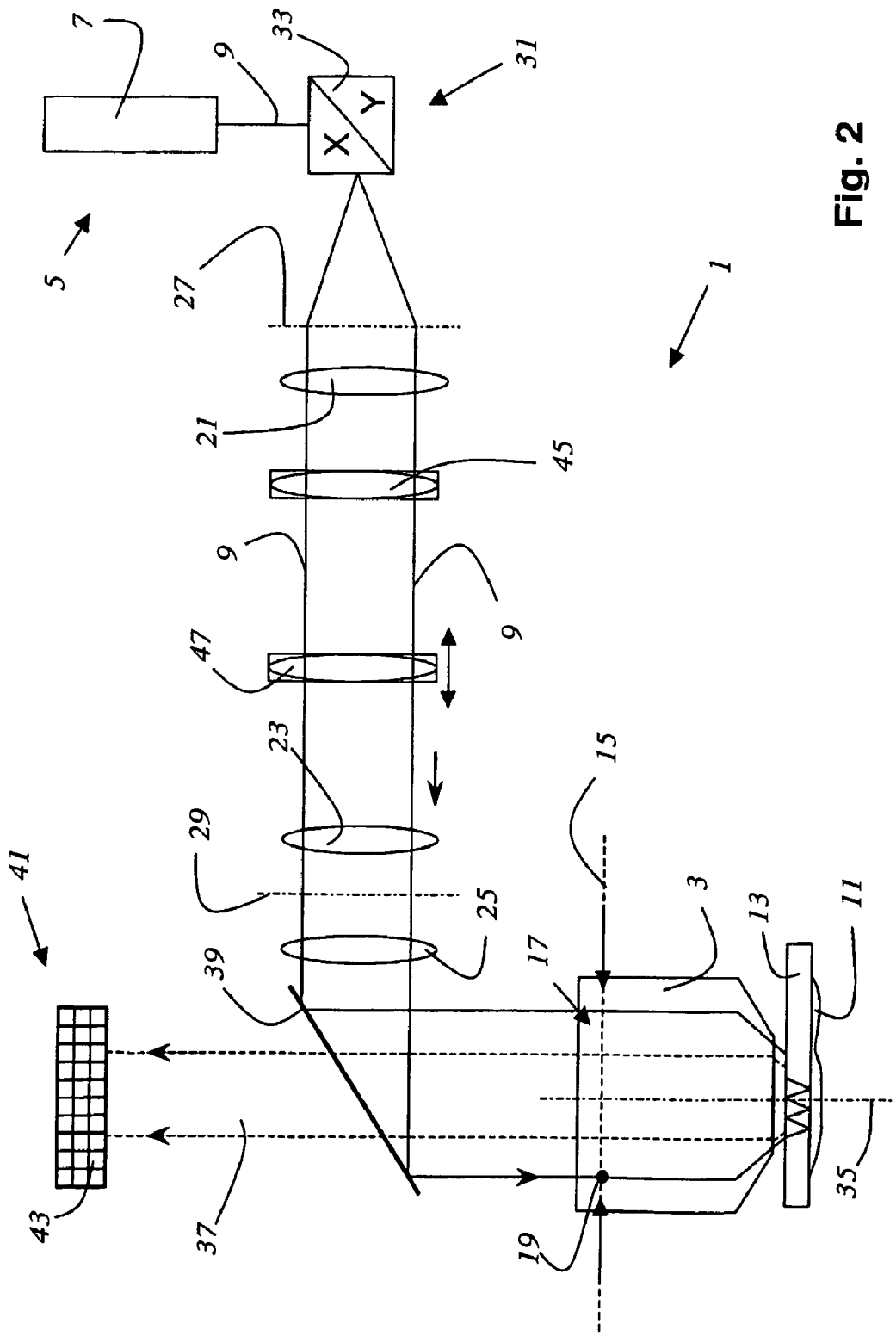
FIG. 2 a further microscope according to the invention.

FIG. 2 shows a further embodiment of a microscope 1 according to the invention. In this variant, the illumination light beam 9 is continually directed along a circular path in the objective pupil plane such that the illumination light beam 9 always strikes the sample holder 13 at the same angle to the optical axis 35 of the objective 3, however, with a continually changing direction of incidence. A compensating optic 45 is further provided to compensate for unevennesses in the objective pupil plane 15. A compensating optic 47 is further provided, which compensates for different pupil positions of different objectives. The compensating optic for this purpose is axially movable.

Figure 3:
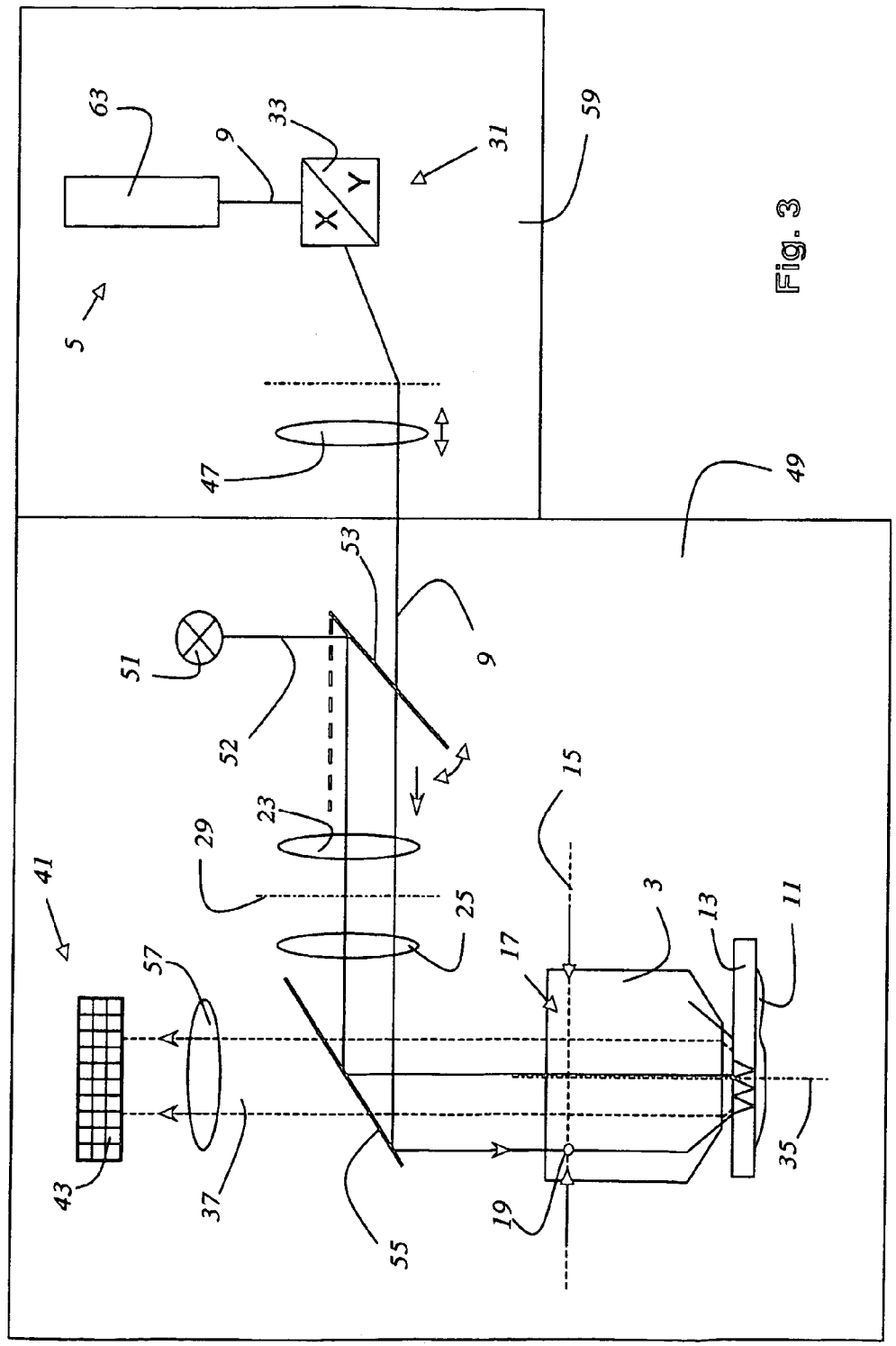
FIG. 3 an illumination module that is coupled to a microscope.

FIG. 3 shows a classic reflected light microscope 49 with an incident illumination light source 51, the light of which 52 is directed onto the sample through the objective 3 via a wing mirror 53 and via an incident light beam splitter 55. The detection light exiting from the sample reaches the camera 43 via the tube optic 57. An illumination module 59 with a light source that is implemented as a multilinear laser 63, and which also comprises an adjustment mechanism 31 and a compensating optic 47, is coupled to the reflected light microscope. To achieve evanescent sample illumination, the wing mirror 53 is tipped in the position indicated by the broken lines. The beam path is thereby cleared for the illumination light beam 9, which, exiting from the multilinear laser 63 via the beam deflector 33 and through the compensating optic 47, reaches the microscope 49. The illumination light beam 9 exhibits a focus 19 in the plane 15 of the objective pupil 17, the position of which may be varied with the help of the adjustment mechanism 31.

Figure 4:
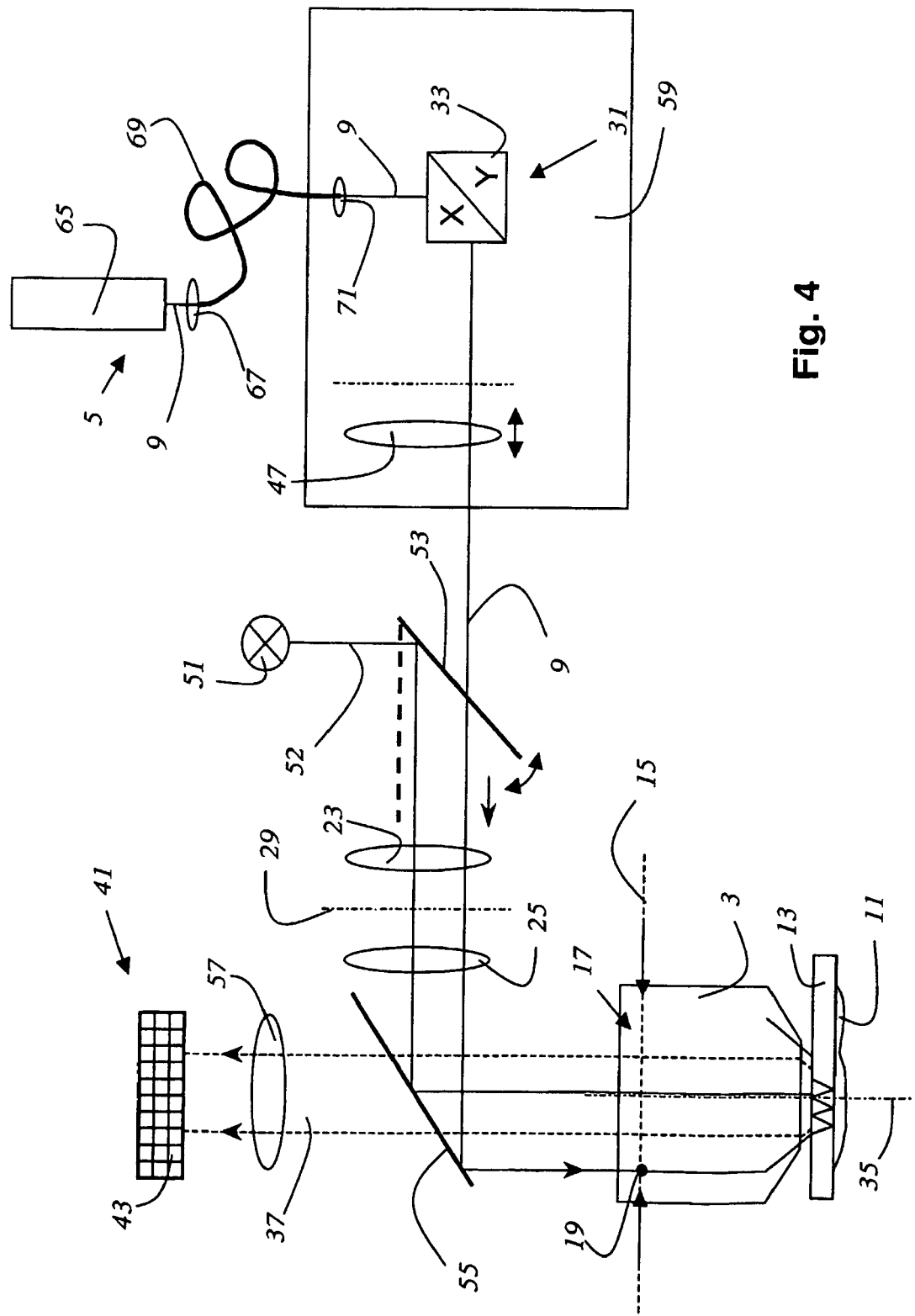
FIG. 4 a microscope with an illumination module.
Figure 5:
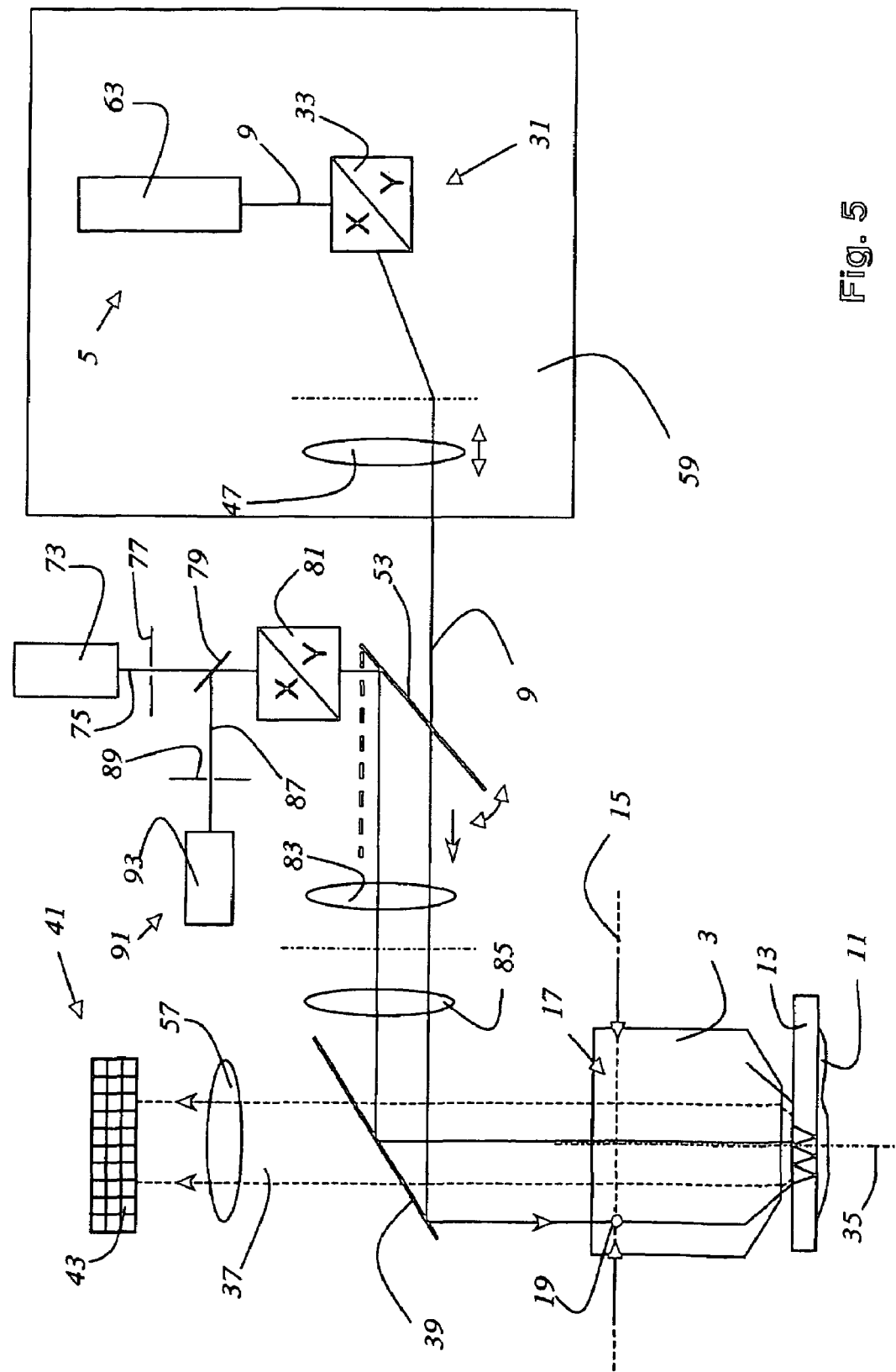
FIG. 5 a further microscope according to the invention.

FIG. 4 shows a microscope with an illumination module 59. The illumination module 59 comprises a light source 5 with a semiconductor laser 65, which emits an illumination light beam 9. The illumination light beam 9 is coupled to a light-conducting fiber 69 by the coupling optic 67, is outcoupled by the outcoupling optic 71, and finally reaches the adjustment mechanism 31, which directs the illumination light beam 9 into the light path as indicated in the previous figures FIG. 5 shows a further embodiment of the invention, in which the illumination module 59, which comprises the one light source 5 and an adjustment mechanism 31 as well as a compensating optic 47, is coupled to a confocal scanning microscope. For evanescent sample illumination, the wing mirror 53 is tipped in the position indicated by the broken lines such that the beam path is cleared for evanescent sample illumination (as previously explained). If the wing mirror is tipped in the position indicated by the solid line, the illumination light 75 emitted by a further light source 73 passes through the illumination light aperture 77 and through the main beam splitter 79, and reaches a further beam deflector 81, which directs the illumination light 75 though the scanning optic 83 as well as through the tube optic 85, as well as via the beam splitter 39 and through the objective 3, and over or through the sample 11. The detection light 87 exiting from the sample passes through the objective 3, the beam splitter 39, the scanning optic 85, and the tube optic 83 back via the same path to the wing mirror 53; and from there onward to the further beam deflector 81, and to the primary beam splitter 79, which directs the detection light 87 through the detection pinhole aperture 89 to the detector 91, which is implemented as a multiband detector 93. Both evanescent sample illumination and confocal scanning of the sample may be accomplished in this further embodiment of the microscope according to the invention. Both functions may be used simultaneously with appropriate implementation of the wing mirror 53 (for example, as a dichroic beam splitter).

The invention was described in relation to a particular embodiment. However, it is clear that changes and variations may be implemented without abandoning the scope of the following claims.

What is claimed is:

1. A microscope comprising:
   a microscope objective having a front lens, an optical axis, and a rear objective pupil plane;
   a light source for producing an illumination light beam having a focus in the rear objective pupil plane and generating evanescent illumination of a sample at a sample interface; and
   one adjustment mechanism for outputting the illumination light beam to a beam splitter disposed along the optical axis, which beam splitter directs the illumination light beam to the microscope objective,
   wherein the adjustment mechanism is provided for varying a distance between the focus of the illumination light beam in the rear objective pupil plane and the optical axis of the microscope objective, thereby varying a depth of penetration of the evanescent illumination in the sample,
   wherein the adjustment mechanism varies the distance between the optical axis and the focus of the illumination beams along a selectable circular path within the rear plane of the objective pupil plane, and
   wherein the adjustment mechanism comprises a beam deflector, which is capable of deflecting the illumination light beam in different lateral directions.

2. The microscope according to claim 1, wherein the beam deflector comprises at least one galvanometric mirror.

3. The microscope according to claim 1, wherein the adjustment mechanism comprises a light-conducting fiber, which is at least partially movable.

4. The microscope according to claim 1, wherein a compensating optic is provided to compensate for unevennesses in the objective pupil plane.

5. The microscope according to claim 1, comprising exchangeable microscope objectives and compensating optics to compensate for different rear objective pupil plane positions of different objectives.

6. The microscope according to claim 1, wherein a switching mechanism is provided to switch between incident illumination and evanescent illumination.

7. The microscope according to claim 6, wherein the switching mechanism comprises a wing mirror.

8. The microscope according to claim 1, in which a light cone is variable in order to change the azimuth.

9. The microscope according to claim 1, wherein a camera is provided for imaging.

10. The microscope according to claim 1, wherein the microscope objective has a numeric aperture that is greater than 1.

11. The microscope according to claim 1, wherein at least the light source and the adjustment mechanism are incorporated in an illumination module.

12. The microscope according to claim 11, wherein the microscope comprises a microscope stand, and wherein the illumination module is detachably coupled to the microscope stand.

13. An illumination module comprising:
a light source for producing an illumination light beam having a focus in a rear objective pupil plane of a microscope objective when the illumination module is coupled to a microscope; and
one adjustment mechanism in the illumination light beam for varying a distance between the focus of the illumination light beam in the rear objective pupil plane and an optical axis of the microscope objective;
wherein the illumination module couples the illumination light beam to the microscope in a direction of a beam splitter disposed along the optical axis, which beam splitter directs the illumination light beam to the microscope objective,
wherein the adjustment mechanism varies the distance between the optical axis and the focus of the illumination light beams along a selectable circular path within the rear objective pupil plane; and
wherein the adjustment mechanism comprises a beam deflector, which is capable of deflecting the illumination light beam in different lateral directions.

14. An illumination module according to claim 13, wherein the beam deflector comprises at least one galvanometric mirror.

15. An illumination module according to claim 13, wherein the adjustment mechanism comprises a light-conducting fiber that is at least partially movable.

16. An illumination module according to claim 13, wherein a compensating optic is provided to compensate for unevennesses in the objective pupil plane.

17. An illumination module according to claim 13, wherein the microscope comprises exchangeable objects, and the illumination module further comprises a compensating optic to compensate for different rear objective pupil plane positions of different exchangeable objectives.

18. An illumination module according to claim 13, wherein a switching mechanism is provided to switch between incident illumination and evanescent illumination.

19. An illumination module according to claim 18, wherein the switching mechanism comprises a wing mirror.

20. An illumination module according to claim 13, wherein a light cone is variable in order to change the azimuth.

21. A microscope comprising:
a microscope objective having a front lens, an optical axis, and a rear objective pupil plane;
a light source for producing an illumination light beam having a focus in the rear objective pupil plane and generating evanescent illumination of a sample at a sample interface; and
one adjustment mechanism for outputting the illumination light beam to a beam splitter disposed along the optical axis, which beam splitter directs the illumination light beam to the microscope objective;
wherein the adjustment mechanism is provided for varying a distance between the focus of the illumination light beam in the rear objective pupil plane and the optical axis of the microscope objective, thereby varying a depth of penetration of the evanescent illumination in the sample; and
wherein the adjustment mechanism comprises an adjustable beam deflector, which is capable of deflecting the illumination light beam in different lateral directions.

22. The microscope according to claim 21, wherein the adjustable beam deflector comprises at least one galvanometric mirror.

23. The microscope according to claim 21, wherein the adjustment mechanism comprises a light-conducting fiber, which is at least partially movable.

24. The microscope according to claim 21, wherein a compensating optic is provided to compensate for unevennesses in the objective pupil plane.

25. The microscope according to claim 21, comprising exchangeable microscope objectives and compensating optics to compensate for different rear objective pupil plane positions of different objectives.

26. The microscope according to claim 21, wherein a switching mechanism is provided to switch between incident illumination and evanescent illumination.

27. The microscope according to claim 26, wherein the switching mechanism comprises a wing mirror.

28. The microscope according to claim 21, in which a light cone is variable in order to change the azimuth.

29. The microscope according to claim 21, wherein a camera is provided for imaging.

30. The microscope according to claim 21, wherein the microscope objective has a numeric aperture that is greater than 1.

31. The microscope according to claim 21, wherein at least the light source and the adjustment mechanism are incorporated in an illumination module.

32. The microscope according to claim 31, wherein the microscope comprises a microscope stand, and wherein the illumination module is detachably coupled to the microscope stand.

* * * * *